US011533918B2

(12) United States Patent
Fischmann (10) Patent No.: US 11,533,918 B2
(45) Date of Patent: Dec. 27, 2022

(54) METHOD FOR PREPARING A PIZZA PRODUCT

(71) Applicant: YAE, LLC, Coral Gables, FL (US)

(72) Inventor: Fernando Benjamin Fischmann, Vitacura Santiago (CL)

(73) Assignee: YAE, LLC, Coral Gables, FL (US)

( * ) Notice: Subject to any disclaimer, the term of this patent is extended or adjusted under 35 U.S.C. 154(b) by 197 days.

(21) Appl. No.: 16/697,781

(22) Filed: Nov. 27, 2019

(65) Prior Publication Data

US 2020/0170263 A1 Jun. 4, 2020

Related U.S. Application Data

(60) Provisional application No. 62/773,843, filed on Nov. 30, 2018.

(51) Int. Cl.
*A21D 13/13* (2017.01)
*A21D 13/41* (2017.01)
*B65D 81/34* (2006.01)
*A21D 10/02* (2006.01)

(52) U.S. Cl.
CPC .......... *A21D 13/13* (2017.01); *A21D 10/025* (2013.01); *A21D 13/41* (2017.01); *B65D 81/3446* (2013.01)

(58) Field of Classification Search
None
See application file for complete search history.

(56) References Cited

U.S. PATENT DOCUMENTS

| 4,283,424 A | 8/1981 | Manoski et al. |
| 5,009,867 A * | 4/1991 | Kratochvil ......... A23C 19/0765 426/120 |
| 5,256,432 A | 10/1993 | McDonald et al. |
| 6,168,812 B1 | 1/2001 | Paulucci |
| 6,753,025 B1 | 6/2004 | Tippmann |
| 2004/0234653 A1 * | 11/2004 | Cogley .............. B65D 81/3453 426/107 |
| 2004/0265438 A1 | 12/2004 | Lamp |

(Continued)

FOREIGN PATENT DOCUMENTS

| CA | 2255394 A1 | 5/1997 |
| JP | H09-299017 A | 11/1997 |

OTHER PUBLICATIONS

International Preliminary Report on Patentability for PCT/IB2019/001274, dated Mar. 17, 2021, 109 pages.

(Continued)

*Primary Examiner* — Lien T Tran
(74) *Attorney, Agent, or Firm* — Merchant & Gould P.C.

(57) ABSTRACT

This invention relates to a pizza product that is prepared separately utilizing two types of doughs that are combined after heating. The doughs have different characteristics and are heated in combination with different ingredients. The heating process for both doughs is performed under different humidity conditions and may be performed simply with a conventional microwave oven. The present invention also includes an apparatus and method for the preparation of such pizzas, as well as an innovative delivery process, which allows delivery of the pizzas from a central delivery station—without the need of having one or more processing locations (e.g., a chain of physical stores) to prepare and/or cook the pizza product.

8 Claims, 4 Drawing Sheets

Side Package Embodiment (56) References Cited

U.S. PATENT DOCUMENTS

2005/0025862 A1    2/2005   Morad et al.
2005/0230383 A1   10/2005   Romeo et al.
2014/0242223 A1    8/2014   Weinstein et al.

OTHER PUBLICATIONS

Written Opinion for PCT Application No. PCT/IB2019/001274, dated Feb. 3, 2021, 24 pages.
International Search Report and Written Opinion for PCT/IB2019/001274, dated Jul. 21, 2020.
Invitation to Pay Additional Fees for PCT/IB2019/001274, dated Apr. 2, 2020.

* cited by examiner

FIG. 1  Dough A (2)

FIG. 2  Dough B (3) with Moisture-Rich Element (4) and the Cheese and Toppings (5)

FIG. 3  Dough B (3) with Moisture-Rich Element (4) and the Cheese and Toppings (5) in a container (6)

FIG. 4 Side Package Embodiment

FIG. 5 Side Embodiment of Packaging

FIG. 6 Heating Process in a Microwave

FIG. 7 Assembled Pizza Product (1)

FIG. 8 Delivery Process

METHOD FOR PREPARING A PIZZA PRODUCT

FIELD OF THE INVENTION

The present invention relates generally to a pizza product; more specifically to a two dough pizza product; and more specifically still to a two dough pizza product wherein the first dough has high crunchiness properties and a second dough is a spongy dough. The present invention also relates to packaging for the pizza product, preferably for both delivery to the end user and for heating the pizza product. The present invention relates still further to an embodiment of an optional delivery/distribution model for the pizza product.

BACKGROUND

The pizza market is one of the most important food markets in the U.S., where pizza is very popular amongst consumers. In 2014, the Department of Agriculture estimated that one out of every 8 Americans eat pizza in a given day. The U.S. pizza restaurant sales resulted in more than 47 billion dollars, and the U.S. pizza retail sales have been estimated to maintain as 5.5 billion dollars for 2019, with the frozen pizza market representing more than 80% of such sales. Worldwide, the pizza market has grown into a 134 billion dollar market.

The market revolving around pizza can be mostly concentrated around three separate areas, which have their different challenges and problems:

1. The fast food pizza market
2. The pizza delivery market
3. The fresh and frozen pizza retail market
   i. Fast Food The fast food pizza market includes larger and smaller chains, with widely known names such as Domino's, Little Caesars, Papa John's Pizza, and Pizza Hut, among others. Most of these pizza chains have thousands of small facilities located around the world, which aim to prepare, cook, and sell pizza products to the final consumer. Some of these facilities may include small restaurant areas for same-place eating, however the most common configuration are relatively small stores with a large pizza prepping and cooking section and a very small customer receiving section, mostly dedicated to customers purchasing and picking up pizzas. In summary, these types of stores can offer: delivery, carry-out, take 'n bake, and dine-in capabilities.

Generally, the most important part of a fast food pizza store is the oven, where historically pizzas were baked in wood-fired brick ovens. However, the need for faster and more autonomous pizza cooking has increased the number of alternatives, such as:

Convection ovens, which have relatively small sizes but also limited cooking capacities to a few pizzas at the time, best suited for low-volume restaurants. These types of ovens also have longer "temperature recovery times", referring to the time it needs to achieve a proper cooking temperature after the door is opened or when cold products are added.

Conveyor ovens, which help to increase production with unskilled workers in high volume stores. The adjustable speed of the belt and constant heat increase cooking time in an automatic way, however, their biggest drawback is their large size and costs.

Other required equipment and spaces include the dough mixer, refrigerators and freezers, large work tables for the dough and pizza prep tables (where the toppings and cheese are found), pizza pans and utensils, along with hot holding cabinets and delivery packages.

For example, a conventional Domino's store averages approximately 1,500 square feet, employs about 6-7 people, and do not offer a full-service dine-in area. Generally, after an order is placed, the pizza maker starts with the dough cutting and stretching, saucing, cheesing, and adds the ordered toppings, which usually takes about 4-5 minutes. Then, the pizza is set up into the oven, where it takes about 7 minutes to cook in a conveyor oven type at 550° F. Then the pizza is cut and packed into the delivery boxes. Therefore, the whole process lasts about 12 minutes before the pizza is ready (assuming there is readily available fresh dough).

Additionally, fast food pizzas cooked in high temperature ovens generally may burn the cheese and toppings, creating a relatively dry top with a soggy crust (that absorbs the moisture of the top content of the pizza). The crunchiness of the crust is shortly perceived, and sometimes may take out the flavor from the rest of the pizza. High temperature ovens tend to dry the ingredients, which results in a decreased volume of the cheese and toppings and a loss of flavor. Also, such ovens are required to be constantly turned on, having large energy consumption and dead-times where no pizzas are being cooked. Therefore, the heating and baking processes take a long time and generally the toppings become dry.

ii. Delivery

It has been estimated that consumers spend around 33 billion US dollars in quick service pizza each year in the United States, where pizza delivery shares around 10 billion of the total market.

Regarding the delivery options from fast food restaurants, this part has always carried out several problems associated to soggy and greasy pizzas, soft crusts, cold temperature, and messy top ingredients, among others.

Throughout the years, there have been many efforts to improve the delivery process, such as:

Using mesh-like covers or screens to separate the pizza from the package (usually a cardboard box), such as Crustsaver™;

Temperature regulating and maintenance bags and systems, which aim to maintain a proper temperature of the pizza while it's being transported into the delivery location (e.g., see U.S. Pat. No. 6,281,477);

Delivery bags and containers with tilt alarms to indicate the inclination of the pizza box in order to avoid messy top ingredients (e.g., see U.S. Pat. No. 5,270,686);

Moisture-absorbent pizza box to avoid the crust from being soggy upon delivery (see e.g., U.S. Pat. Nos. 6,932,267, 4,922,626, among others).

Even the technology company, Apple®, patented a special box for transporting pizza, designed with a series of holes in the lid of the container so that air can escape and therefore helping to avoid the crust from turning soggy.

There have been improvements even in disclosing pizza preparation and delivery vehicles that consider preparing and/or cooking the pizza in route to delivery, such as U.S. Pat. No. 4,556,046A. However, improvements related to the actual delivery process of the pizza have always been related to moving the preparing and/or cooking process from the store into a mobile setting to perform such processes on route to the delivery site. Therefore, by moving the preparation and/or cooking process from a store to a mobile delivery means such as a truck, the required space, equipment, and labor that must be included as part of the delivery process generates many requirements and high costs. A good reference is that no delivery processes for large pizza chains are performed in this manner, not presenting a real solution to today's needs.

Therefore, even though about 10% of pizza product innovations around the world come from the U.S., all of these improvements have not been able to solve these problems.

Further, if pizzas arrive in a cold state, and they are re-heated in a conventional microwave oven, the pizza will result even soggier than upon delivery. On the other hand, if they are reheated in a conventional oven, their final texture is dry (as they lost most of their moisture from the delivery and the temperature of an additional heating process through an oven), additionally having to wait many minutes to pre-heat the oven along with the cooking time.

iii. Refrigerated Fresh or Frozen Pizza Retail Market

The retail refrigerated fresh and frozen pizza market is a $5 billion market only in the U.S., with an annual growth rate of 0.2% expected to grow into 0.5% in the next 5 years. From this 5 billion market, about 80-90% corresponds to the frozen pizza retail sales.

Frozen pizzas has historically been among the most popular frozen foods, and given their highly flexible customization, many industry operators have created new strategies over the years to offer different and new products to overcome consumer tendencies. Top refrigerated pizza brands in the U.S. include Di Giorno, Red Baron, and Tombstone, among others, with the leading manufacturer being Nestle's USA, with more than a 43% market share, followed by Schwan Food Co. with a 19%.

Also, individual sized pizzas are gaining more popularity over the last years and being part of the daily snacking consumer routines.

Consumers have indicated that purchasing of frozen pizza instead of buying pizza from a restaurant obeys to quicker and easy meals, lower costs, larger shelf life, and faster than delivery or carry-out. Also, thin crust is the preferred option by U.S. consumers, followed by a regular crust.

However, refrigerated and frozen pizza cooking times, which refers to the full time period from when the pizza is removed from the refrigerator/fridge and is ready to eat, are relatively long. Most refrigerated and frozen pizza products aim to be heated in conventional oven, where generally the following processes must occur: (1) Preheat the oven up to 400° F., which takes at least 10-15 minutes; and (2) Bake the pizza for 20-25 minutes. Both processes can take up to 30-40 minutes altogether, which is a large waiting time for obtaining the final heated product.

Additionally, if heated in a microwave oven, the refrigerated/frozen pizza turns out to be soggy and does not have a crunchy crust.

The microwave pizza market has not expanded as there have not been any major improvements lately to obtain high quality products with good taste and that maintain high moisture and crunchiness properties. Generally, when frozen pizzas are microwaved, the crust wither becomes soft and soggy, rubbery, or extremely dry and hard (depending on the type of dough). Also, the cheese may not melt evenly and may become gooey, or eventually burn up and dry up while the rest of the pizza has not been heated properly, given the differences in moisture between the dough and the cheese and toppings. Since microwave ovens operate by radiation rather than heat, the radiation moves the particles in the food around which causes the food to get warm, and when there are water molecules in the food they turn into steam. The steam condenses and causes the food to become soggy, to burn, or to become dried out.

Therefore, even though the market has introduced products that can be heated in a microwave oven, they have not been successful as the final quality and taste have not been widely accepted by consumers.

Further, a problem of refrigerated/frozen pizzas when cooked according to their instructions is that while the heating process is occurring, moisture is transferred from the top section containing the cheese, sauce, and toppings, to the crust, therefore providing moisture to the crust and reducing its crunchiness.

However, refrigerated and frozen pizza products have not been able to overcome the following problems:
  A. Being able to heat and provide a wet and crunchy well-cooked pizza in short periods of time, lower than 3 minutes
  B. Producing a crunchy crust and moisture-rich cheese and toppings, avoiding moisture-transfer from the top section to the crust, while avoiding the top section to be overly cooked and dry In view of the foregoing issues, there is a need for a pizza product with a crunchy crust and moisture-rich cheese and toppings without avoiding the transfer of moisture to the crust while heating or cooking the pizza.

SUMMARY OF THE INVENTION

This present invention relates to a high quality pizza with higher moisture and at the same time higher crunchiness than current fast food and retail pizzas. Embodiments of the pizza product in accordance with the principles of the present invention include two types of doughs that are combined after heating, and where such doughs have different characteristics and are heated in combination with different ingredients, and where the heating process for both doughs is performed under different humidity conditions and may (optionally) be performed simply with a conventional microwave oven. Further, the present invention also provides for apparatus and methods for the preparation of such pizzas, wherein utilizing such preparation has an advantage of requiring less equipment, labor and time than standard fast food and retail pizzas. Still further, the present invention also refers to an innovative delivery process, which allows to deliver pizzas from a central delivery station without the need of having one or more processing locations, which are usually a chain of physical stores, to prepare and/or cook the pizza product.

Therefore, according to one aspect of the invention, there is provided a pizza product, which has higher crunchiness and moisture, and is able to being prepared in a short amount of time, with less equipment, and less labor than current pizza products, which is formed by the combination of two separate doughs that have different properties, are accompanied by different ingredients, and are heated under different humidity conditions before the pizza product is assembled and served, wherein the pizza product comprises: a first dough part, referred to as Dough A, that has high crunchiness properties, such as a pie dough, that is heated under low humidity conditions that causes Dough A to retain its firm and crunchy properties; a second dough part, referred to as Dough B, comprising a spongy dough, such as sandwich bread or sponge cake, which is combined with a moisture-rich product, such as flavored gel like tomato gel, wherein Dough B is able to capture the moisture from the moisture-rich product; and wherein heating process both dough parts, Dough B along with the moisture-rich product and additional ingredients are placed on top of Dough A, forming the final pizza product.

According to a further aspect of the invention, a microwaveable container is provided for containing Dough B along with its moisture-rich product and additional ingredients, in order to allow performing the heating process, wherein the container is arranged and configured to maintain a controlled humidity-rich environment with saturated vapor while heated, and after heating Dough B and the moisture-rich product obtain a paste-like texture.

According to yet another aspect of the invention, there is provided a delivery process for a pizza product, the process comprising: providing at least one preparation hub that is a physical location where components of the pizza product are prepared, wherein such preparation hubs provide the ready-to-heat pizza products to at least one distribution hub such as refrigerated trucks or physical locations located strategically for efficient distribution; distributing the ready-to-heat pizza product through the distribution hubs, wherein the at least one distribution hub is equipped with refrigeration equipment to maintain suitable refrigeration temperature of the pizza product; transporting the pizza product comprising the two dough parts through mobile transportation means, such as a delivery car, motorcycles, or similar means that are equipped with a portable microwave device, wherein the portable microwave device allows to heat up both parts of the pizza product, namely Dough A and the container containing Dough B along with the moisture-rich product and additional ingredients in a short period of time; performing a heating process on the mobile delivery means, on the way to the final delivery point, or upon arriving at the final destination; delivering the heated the pizza product in a ready-to-assemble basis, wherein either the delivery person or the final consumer will assemble the pizza according to the methods described previously, to obtain the final pizza product that maintains with high crunchiness and moisture that has not been achieved by similar delivery methods; and wherein the instant pizza product is delivered in a heated state with very low costs and in a short period of time, while maintaining a high crunchiness and moisture.

While the invention will be described with respect to preferred embodiment configurations and with respect to particular devices used therein, it will be understood that the invention is not to be construed as limited in any manner by either such configuration or components described herein. While the example of particular doughs, microwavable containers, and/or the optional delivery/distribution model is provided herein, the principles of this invention extend to any two dough pizza product having the attributes described herein. These and other variations of the invention will become apparent to those skilled in the art upon a more detailed description of the inventions.

The advantages and features which characterize the inventions are pointed out with particularity in the claims annexed hereto and forming a part hereof. For a better understanding of the inventions, however, reference should be had to the drawings which form a part hereof and to the accompanying descriptive matter, in which there is illustrated and described preferred embodiments of the inventions.

BRIEF DESCRIPTION OF THE DRAWINGS

Referring to the drawings, wherein like numerals represent like parts throughout the several views.

DETAILED DESCRIPTION

The present invention relates to a high quality pizza product and a method for preparing a pizza product, wherein the pizza is heated and assembled in a manner that results in higher moisture and at the same time higher crunchiness than current fast food and retail pizzas. The present invention also optionally provides a centralized manufacture and delivery process, wherein such delivery process delivers pizzas from a central delivery hub without the need of having a local physical store to prepare and/or cook the pizza product.

Regarding the retail market of fresh and frozen pizza products for homes and offices for example, embodiments according to the present invention may be heated and assembled in less than 1 minute using a simple conventional microwave oven while achieving high moisture, and at the same time high crunchiness properties, in a short period of time. In contrast, current, conventional fresh and frozen pizza products are generally required to be heated up in conventional convection ovens that take a long time to pre-heat up to the required heating temperature, and then take an additional time to heat the pizza product, which usually takes more than 20 minutes. In addition, high crunchiness and high moisture are rarely accomplished at the same time.

Regarding the restaurant market, stores that today are not able to offer pizza products since they don't have the required equipment or space to provide these products, such as specialized ovens and preparing and processing space for the dough, may utilize pizza products in accordance with the principles of the present invention by having (or installing) a microwave oven. This would allow the stores to provide high quality pizzas as part of their menu.

Regarding the delivery market, pizza products according to the present invention provide for delivery of a high quality pizza product without requiring a local physical store to prepare and/or cook the pizza. Instead, a microwave oven that may be portable and provide for heating the pizza product in route to the delivery location may be employed. Additionally, the delivery of the ready-to-heat product can be performed where the final consumer can heat the product in a short period of time, and assemble the product themselves obtaining a high quality pizza with higher moisture and crunchiness than conventional delivery pizza products.

As used in the present application, the term "crunchiness" refers to the ability of the dough to offer resistance to chewing, presenting a tougher dough that has low flexibility and that when chewed emits a recognizable noise. Some examples of crunchy foods include croutons, crackers, shortbread cookies, potato chips, among others.

Figure 1:
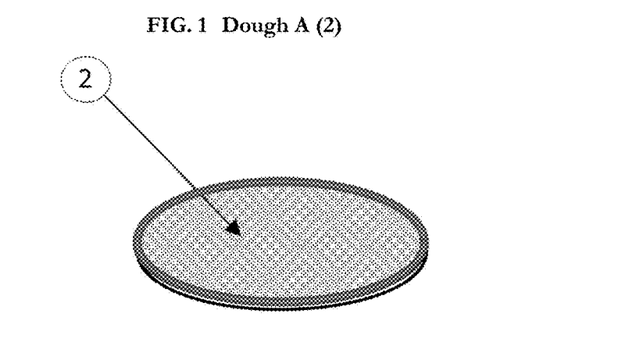
FIG. 1 shows a circular embodiment of crunchy Dough A (2).
Figure 2:
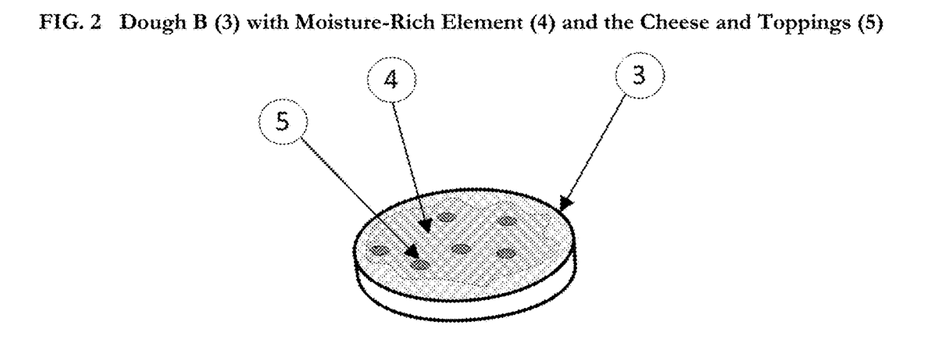
FIG. 2 shows a circular embodiment of Dough B (3) combined with a moisture rich product, like a tomato gel, (4) and additional ingredients (5) such as cheese and toppings.
Figure 7:
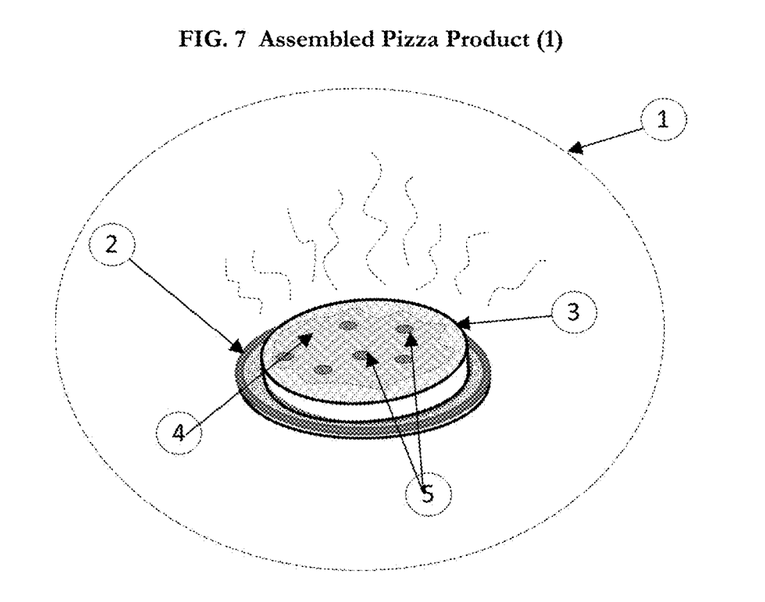
FIG. 7 shows and embodiment of the heated and assembled pizza product (1), including Dough A (2) on the bottom and Dough B (3) on the upper part, where Dough B (3) has been combined with a moisture rich product (4) and additional ingredients (5).

A preferred embodiment of the present invention is disclosed herein. The preferred embodiment pizza product includes two separate dough parts, wherein the first dough part (Dough A) is a crunchy dough that constitutes the base of the final pizza product, and the second dough part (Dough B) is a spongy dough that when combined with a moisture-rich product can capture the moisture, and that after heating results in a paste-like product that constitutes the upper part of the pizza product. Both dough parts are cooked under different humidity conditions, and after the heating process they are both joined together by placing Dough B along with its moisture-rich product and additional ingredients on top of Dough A, providing the final pizza product. As it will be explained later, it is important to note that both dough parts can be heated simultaneously in a microwave oven.

The first dough part, which is referred to as Dough A throughout the specification, refers to the bottom part of the pizza, which has crunchy conditions such as the dough from meat pies and tartlets. Dough A is pre-cooked in a conventional oven in order to generate the ready-to-heat product. In an embodiment of the invention, Dough A comprises different types of doughs or combinations of doughs.

When it is time to assemble and/or serve the final pizza product, the ready-to-heat Dough A product is heated in a dry environment, such as a toaster, or a conventional microwave oven with low humidity conditions that allow maintaining its crunchiness. Additionally, the heating process may include a moisture-absorbent element, such as paper, or cardboard.

The second dough part, which is referred to as Dough B throughout the specification, refers to the upper portion of the pizza, which comprises a spongy dough that is combined with a moisture-rich product and additional ingredients, and that when it's heated results in a paste-like product. As previously mentioned, Dough B is combined with a moisture-rich product that provide moisture that is able to be captured by Dough B. Such products comprise an edible gel that is flavored with different essences or flavors such as tomato paste, fresh tomatoes, scalded tomatoes, and meat concentrates, among others. In a preferred embodiment, the moisture rich product is a tomato gel, which allows to have a firm product that when heated is dissolved and produces a paste-like texture that does not get Dough B wet. Additionally, different ingredients can be added to Dough B, such as fresh tomato and fresh vegetables, or other products such as cheese and oregano. In an embodiment of the invention, Dough B comprises different types of doughs or combinations of doughs.

Figure 3:
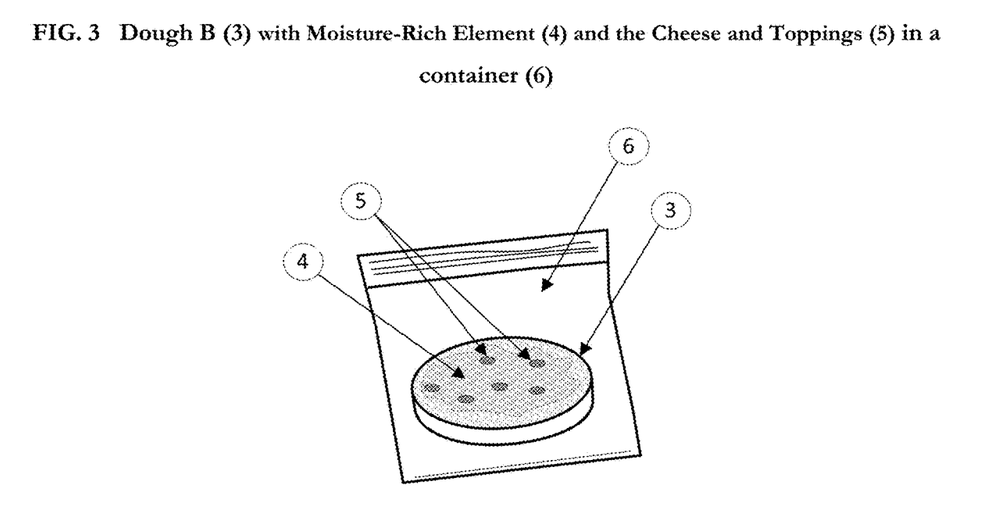
FIG. 3 shows a circular embodiment of Dough B (3), where a container (6) contains Dough B (3) combined with a moisture rich product (4) and additional ingredients (5) such as cheese and toppings.

Dough B has a ready-to-heat preparation that comprises a container from a microwaveable safe material, such as a plastic or paper bag, which contains Dough B along with the moisture-rich product and additional ingredients, in order to be able to carry out a heating process under high humidity conditions where Dough B and the moisture-rich product obtain a paste-like texture. The container is designed and configured to allow the heating of Dough B, the moisture rich product, and the additional ingredients altogether in the same container, which is required to be microwave-safe and includes vacuum sealed packages, easy-open packages like zip lock-type packages, shrink films, press & seal packages, and similar packages. The container includes a safety system to avoid it from exploding from increased pressure inside the container, such as valves, pressure relief systems, holes, special materials that allow air to leave the container, and similar systems.

When it is time to assemble and/or serve the final pizza product, Dough B is heated up in specific conditions so that generation of saturated vapor is allowed, where Dough B captures the humidity from the moisture-rich product. This is achieved by heating up the container that contains Dough B, the moisture rich product, and the additional ingredients, where the container includes minimal ventilation (to avoid it from exploding from high pressures) and is heated in a microwave oven.

Therefore, as previously explained, both Dough A and Dough B have different properties, can be combined with a moisture rich product and different ingredients (if any), and are heated up in different ways and under different humidity conditions.

After the heating process, both Dough A and Dough B are joined together by placing the paste-like heated Dough B with the moisture rich product and additional ingredients, on top of Dough A through the use of different types of packaging and assembly methods, generating a high quality product with high moisture and crunchiness in a shorter period of time, and requiring much less equipment and labor than other retail or fast-food pizza products.

The two dough portions, Dough A and Dough B are provided separately, where Dough A is separate from Dough B, and wherein Dough B, the moisture-rich product, and additional ingredients are packaged in a container.

The heating process for both doughs may be performed with different equipment or using common equipment or appliance at the same time.

Figure 6:
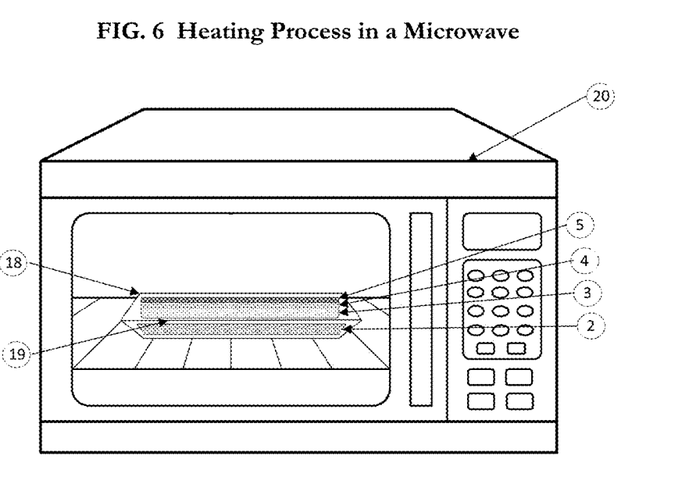
FIG. 6 shows a heating embodiment wherein a three layer packaging (18) is used for heating the pizza product with a microwave oven (20).

In a first embodiment of the application, only a simple microwave oven is needed, wherein Dough A and the container comprising Dough B, the moisture rich product, and additional ingredients, are heated up in the same interior microwave space but maintaining a physical separation. For example, Dough A is heated in the microwave oven with the option of using a moisture absorbent material such as cardboard, while the separate container containing Dough B along with the moisture rich product and additional ingredients is also heated in the microwave oven at the same time. Therefore, moisture migration from the humid products inside Dough B's bag is avoided while both products are being heated within the same microwave oven interior space.

In a second embodiment of the application, Dough A is heated up in a conventional toaster, where Dough A is heated up by itself with no need of additional packaging, in order to allow dry heat to cook Dough A and provide a crunchy texture, while the container containing Dough B along with the moisture-rich product and additional ingredients is heated in a conventional microwave at the same time.

After heating both parts of the pizza product, they are joined together by incorporating the humid and moisture-rich paste-like contents from the container (including Dough B, the moisture rich product, and additional ingredients) on top of Dough A, achieving a final pizza product with excellent crunchiness and moisture conditions, and excellent quality and taste in a very short period of time, with minimal equipment, and requiring minimal labor compared to conventional pizza products.

Under specific circumstances, and depending on the type of dough B, moisture rich products, and additional ingredients that are used, which may result in a stickier product that has more difficulty sliding from a tray or separator in order to be placed on the bottom dough without affecting it's configuration and look, then different assembly methods can be used such as assembling the pizza in an upside down manner so that transferring the top part of the pizza is easier.

Embodiments of the present invention allow that the pizza components are assembled in a manner that the top portion of the pizza product is placed on top of the bottom portion in an upside down manner, then they are heated, and then the assembled pizza product is flipped before removing all packaging.

The shape of the pizza product can vary from a classic circular shape, into a more square or rectangular shape, to accommodate the heating equipment.

Embodiments of the present invention provide for a pizza product that may preferably be designed to be sold to the final customer in either a fresh state, frozen state, or already heated condition, depending on the type of market. However, as previously noted above, the pizza product may cover the needs of three different markets: (1) the fast food market, (2) the delivery market, and (3) the retail market.

Figure 4:
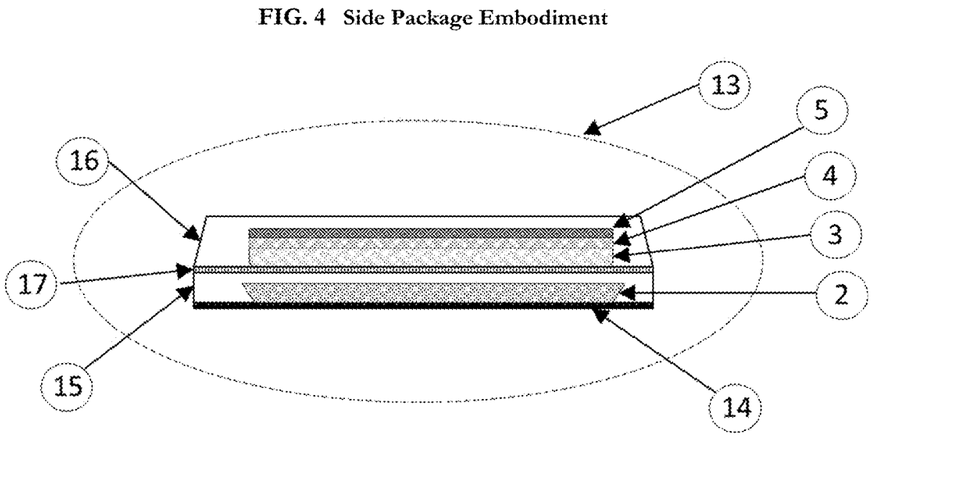
FIG. 4 shows an embodiment of the packaging (13) for the pizza product, wherein Dough A (2) is heated in a lower portion of the packaging, which comprises a moisture-absorbent material (14) and lower portion walls (15) to create a hollow space for Dough A, and wherein Dough B (3) along with its moisture rich product (4) and additional ingredients (5) is heated in the upper portion of the packaging, comprising a containment film (16), and where both the upper and lower portion are separated by a separation tray (17) that allows for an easy assembly of the final heated pizza product.
Figure 5:
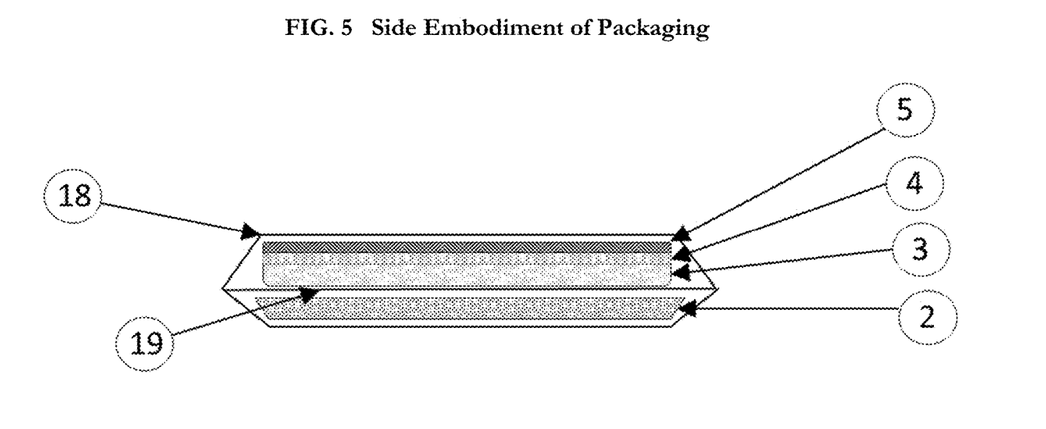
FIG. 5 shows another embodiment of the packaging (13) for the pizza product, which is a three layer packaging (18) separating both parts of the packaging through a middle film layer (19).

The present invention also provides embodiments having suitable packaging for an efficient and simple heating of the pizza product, wherein the packaging includes containers, plastic bags, zip lock-type bags, paper bags, auto-seal bags, easy open containers, cardboard, shrink films, and similar materials, and wherein the packaging is made out of microwave-safe materials.

The packaging generally includes an upper portion, a lower portion, and a separating middle portion.

In an embodiment of the invention, the lower portion of the packaging has a hollow volume dedicated for placing and heating Dough A under dry heat conditions to maintain its crunchiness, wherein the lower portion includes a moisture-absorbent material and lower portion walls to create the hollow volume housing Dough A. The upper portion of the packaging includes a containing film that allows containing Dough B along with its moisture-rich product and additional ingredients, in order to provide a closed heating environment with high humidity and allow to maintain the moisture of the inside product. The containment film is configured so that it minimizes movement of Dough B, the moisture-rich product, and the additional ingredients as to maintain its aesthetics while transporting. Both parts of the packaging are separated through the separating tray, which after heating is easily removed to be able to place the heated Dough B with its moisture-rich product and additional ingredients, on top of Dough A and assemble the final heated pizza product.

In another embodiment, the packaging comprises a three layer film container, which houses Dough A in its lower part, and houses Dough B with its moisture-rich product and additional ingredients on the upper part, separated by a middle film layer that is easily removed after heating, as to be able to place the heated Dough B with its moisture-rich product and additional ingredients on top of heated Dough A.

In another embodiment, the packaging comprises two sections, with one section housing the container (containing Dough B, the moisture-rich product, and additional ingredients) which has an easy-tear system that can be accessed from the exterior of the package. The easy-tear system allows to open and/or separate the container in order to allow its contents to be placed on top of Dough A with a simple movement. The easy tear system may comprise an initially scored or semi-scored tear line as commonly employed on individual food packaging such as ketchup, peanuts and the like.

In another embodiment of the invention, a third dough is included within the pizza product, where the third dough acts as a separator between the first dough and the second dough, the moisture rich product, and its additional ingredients. The third dough can be used as a separating layer that can be used as part of the microwaveable container that contains the second dough, the moisture rich product, and the additional ingredients. In an embodiment, the third dough corresponds to the underside of the container, so that the other sides of the container (top and sides) are covered with a plastic or paper material that is easily removable. In this manner, if the third dough acts as the underside of the microwaveable container, the transfer process for placing the second dough, the moisture rich material, and additional ingredients, is simplified as the bottom of the container is also an edible dough that is placed directly over the first dough to assemble the pizza product. The third dough, being the underside of the microwaveable container, is able to absorb moisture from the heating process of the second dough, the moisture rich product, and the additional ingredients, at the same time minimizing moisture transfer to the first dough.

In all of these embodiments for the packaging, it is considered that the assembly process for the pizza product comprises removing a plastic film or separator from in between both sections of the package, wherein the top Dough is placed over the bottom Dough in an upside-down manner, to then flip the complete package and have the final pizza product ready to eat.

Regarding the delivery process, embodiments of the present invention allows for transformation of the pizza delivery market and processes, by minimizing the logistic requirements of preparing and cooking the pizza product, at the same time avoiding the need to having a local, physical store for preparing and cooking the pizza product. On the other hand, the present invention does not require facilities, equipment, or space for preparing and cooking the pizza product, but may employ only a small microwave oven for heating the pizza product.

Figure 8:
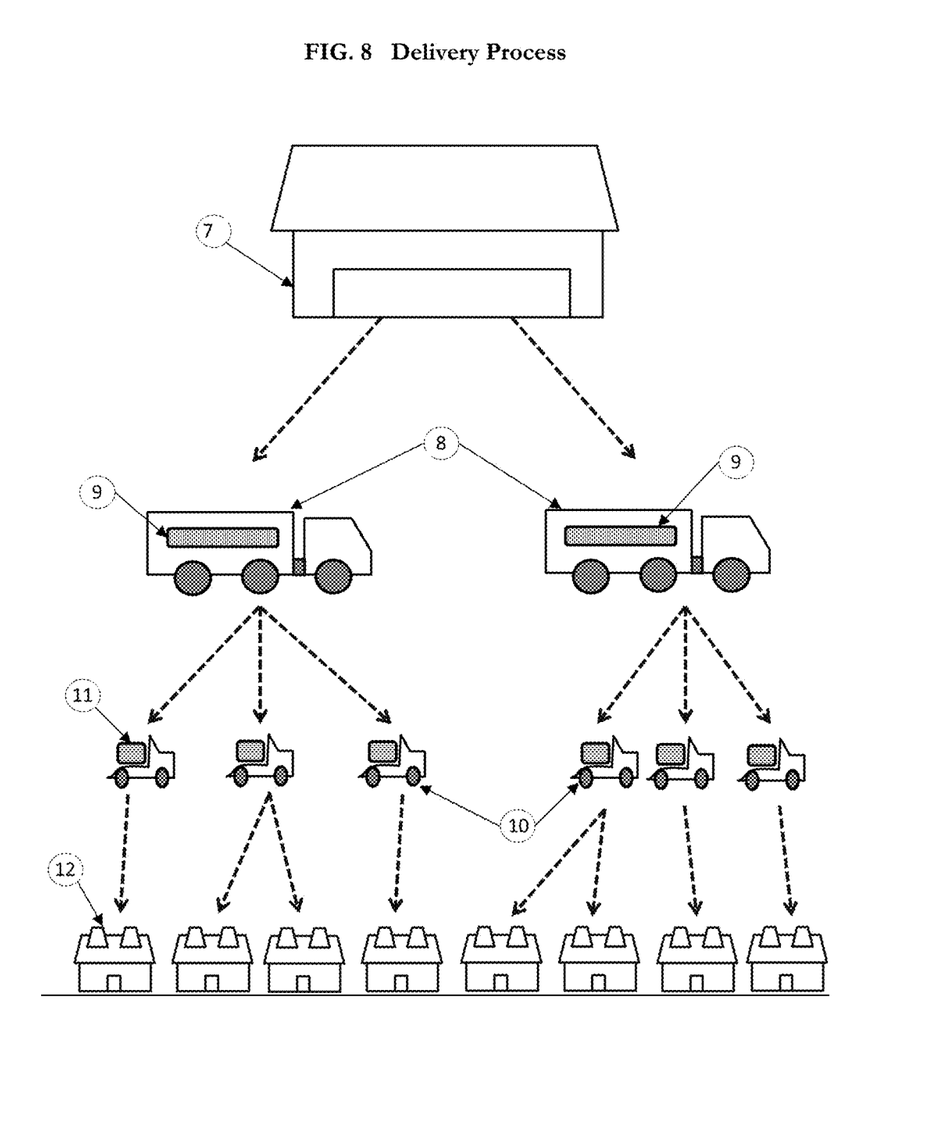
FIG. 8 shows a preferred embodiment of the delivery process according to the present invention, wherein at least one preparation hub (7) distributes the pizza products to at least one central distribution hub (8), which are mobile hubs, are located in strategic locations, and include refrigeration equipment (9) for maintaining the ready-to-heat pizza products. The ready-to-heat pizza products are provided to the mobile delivery means (10), which are equipped with a portable microwave oven (11) in order to heat the pizza product. The mobile delivery means (10) transports the pizza product to the final delivery location (12).

The delivery process from the present invention comprises having at least one preparation hub, which cooks and prepares the pizza products. Such preparation hub distributes the ready-to-heat pizza products to a distribution hub. Such distribution hubs are equipped with refrigeration equipment to keep the frozen or fresh pizza products at a temperature of no more than 15° C. most of the time. In a preferred embodiment, the distribution hub comprises mobile centers such as distribution trucks or vans that can park in different locations depending on the demand. In another embodiment of the invention, the distribution hub is a fixed distribution center with a fixed location. Such distribution hubs, when mobile, can move to high demand locations taking in account consumer behavior.

In contrast to a conventional delivery store, which is a fixed location store that receives products to assemble the pizza and has equipment and space to prepare and cook the pizza products, the present invention only requires that the distribution hubs have small refrigeration equipment to maintain the ready-to-heat pizza products, therefore not requiring to have a physical store for preparing and/or cooking the pizza product. As a reference, in the U.S. the four largest pizza chains account for more than 19,000 physical pizza stores, which would not be needed with the innovative delivery process from the present invention.

The delivery process from the distribution hub to the final destination is then carried out by a smaller mobile transportation means, such as a delivery car, small truck, motorcycles, or similar means.

The heating process can be performed in the central distribution hub, on the way to the delivery point, or it can be done once arrived at the final destination. Preferably, the heating process is performed in-route to the final delivery point, wherein the mobile transportation means is equipped with a portable microwave device. Therefore, the portable microwave device allows to heat up both Dough A and the container containing Dough B along with the moisture rich product and additional ingredients in parallel and in the same appliance in a very short period of time, and deliver a pizza product at a hotter temperature than standard delivery pizzas.

Then, the pizza product is delivered in a heated state with very low costs and in a short period of time.

For the assembly of the pizza product, a first option is that the pizza product is delivered in a heated state but not in a ready-to-eat state, as the final consumer will assemble the pizza according to the methods described previously, to obtain the final pizza product that maintains crunchiness and moisture properties with good quality and flavor, which has not been achieved by similar delivery methods.

Another option for the assembly of the pizza upon delivery, is that the delivery person uses a simple packaging that allows to assemble the pizza before giving it to the customer. The packaging used for delivery can allow a simple assembly without requiring to manipulate each dough separately, but only manipulating the package and its easy transfer system for placing the contents of the container on top of Dough A.

The products and methods described herein can also be used for similar food preparations and different markets, taking advantage of the simplicity and efficiency of the heating, packaging, and delivery processes.

Example 1

The pizza product from the present invention was prepared in order to conduct a sensory panel and compare the crunchiness and moisture of the product compared to other products found in the market.

The first dough part, Dough A was manufactured from a mixture of flour of the 0000 type, water, margarine and salt, with food preservatives for maintaining its freshness. For the preparation of Dough A, a mix of 3 cups of flour, 1.5 tablespoons of margarine, 1 cup of warm water, and 1 teaspoon of salt was used.

The second dough, Part B, was manufactured from a white sandwich bread type cooked dough, specifically a by removing its crust and maintaining the white cooked dough as the spongy dough. Additionally, the moisture-rich product is a previously mixed and cooled gel flavored with tomato sauce.

The gel is prepared by using 500 grams of tomato sauce with a pizza flavor, and 5 grams of powered agar-agar. The tomato sauce is heated and the agar-agar powder is added to the mix while still warm, then the mixture is boiled for 3 minutes while stirring. The mix is then emptied into a container that allows to cool it down, cut it, and obtain round circles that are easy to manage in a gel state.

Then, the gel is placed over the spongy bread dough, and toppings are added on top. For example, the toppings may include Gouda cheese and oregano. Such layered product is then placed in a microwaveable-safe plastic bag, which is then sealed.

| Listing of elements shown in the drawings: | |
|---|---|
| Number | Description |
| (1) | Pizza Product |
| (2) | Dough A |
| (3) | Dough B |
| (4) | Moisture Rich Elements |
| (5) | Cheese and Toppings |
| (6) | Container |
| (7) | Preparation Hub |
| (8) | Distribution Hub |
| (9) | Refrigeration Equipment |
| (10) | Mobile Delivery Means |
| (11) | Microwave Equipment |
| (12) | Final Delivery Location |
| (13) | Packaging |
| (14) | Moisture-Absorbent Material |
| (15) | Lower Package Walls |
| (16) | Containment Film |
| (17) | Separation Tray |
| (18) | Three Layer Container |
| (19) | Middle Film Layer |
| (20) | Microwave Oven |

It should be understood that even though numerous characteristics and advantages of the present invention have been set forth in the foregoing description, together with details of the structure and function of the invention, the disclosure is illustrative only and changes may be made in detail, especially in matters of the supporting hardware, components and devices, and to the full extent indicated by the broad general meaning of the terms in which the appended claims are expressed.

What is claimed is:

1. A method for preparing a pizza product in a microwave, the pizza product formed by two dough parts, Dough A and Dough B, which are provided separately, the method comprising:
providing a pre-baked dough referred to as Dough A with crunchy properties;
providing a spongy dough, referred to as Dough B;
heating in the microwave the crunchy dough (Dough A) under low humidity conditions to maintain its crunchy properties, wherein low humidity conditions are defined as those in a dry environment of a conventional microwave oven;

placing a moisture-rich product onto the spongy dough (Dough B), which generates moisture as it is heated creating a high humidity, and wherein the moisture rich product is selected from the group consisting of tomato gel, tomato paste, fresh tomatoes, and scalded tomatoes;

adding additional ingredients including cheese and toppings over the moisture-rich product;

placing the spongy dough (Dough B), along with the moisture-rich product and additional ingredients in a container that is able to maintain the high humidity levels when it is heated in a microwave;

heating the container containing the spongy dough, along with the moisture-rich product and additional ingredients wherein moisture from the moisture rich product is captured by the spongy dough (Dough B);

placing the heated spongy dough (Dough B) along with the moisture-rich product and additional ingredients on top of the heated and crunchy dough (Dough A), generating a final pizza product that maintains crunchy and moisture properties; and wherein the crunchy dough (Dough A) and the container containing the spongy dough (Dough B), along with the moisture rich product and additional ingredients are heated simultaneously in the microwave oven and the heating process for both dough parts (Dough A and Dough B) is performed under different humidity conditions.

2. The method of claim 1, wherein the dough A is a pie dough and dough B is a sandwich bread or sponge cake.

3. The method of claim 1, wherein the crunchy dough (Dough A) is heated for a time period of between 10 seconds and 60 seconds.

4. The method of claim 1, wherein the crunchy dough (Dough A) is heated along with a moisture-absorbent material, selected from the group consisting of cardboard and paper.

5. The method of claim 1, wherein the container containing the spongy dough (Dough B), along with the moisture rich product and additional ingredients is heated in the microwave oven for a time period of between 10 and 40 seconds, at an average power of 800 W.

6. The method of claim 1, wherein the additional ingredients are selected from the group comprising cheese, pepperoni, sausage, vegetables and oregano.

7. The method of claim 1, wherein the crunchy dough (Dough A) is heated in packaging having a hollow volume in which the crunchy dough is placed.

8. The method of claim 1, wherein the spongy dough (Dough B) has a texture selected from the group consisting of sandwich bread and sponge cake.

* * * * *